United States Patent [19]

Spaulding

[11] 4,303,296
[45] Dec. 1, 1981

[54] MODULAR INTERFACE CONNECTOR

[75] Inventor: Tedford H. Spaulding, Norridge, Ill.

[73] Assignee: Bunker Ramo Corporation, Oak Brook, Ill.

[21] Appl. No.: 107,309

[22] Filed: Dec. 26, 1979

Related U.S. Application Data

[62] Division of Ser. No. 902,330, May 3, 1978, Pat. No. 4,239,316.

[51] Int. Cl.³ .............................................. H04M 9/00
[52] U.S. Cl. ........................... 339/122 R; 339/126 R; 339/147 R; 339/198 R; 179/98; 361/415
[58] Field of Search ............, 179/1 PC, 98; 339/17 C, 339/17 LC, 91 R, 125, 126, 176 M, 176 MP, 147, 122; 361/415

[56] References Cited

U.S. PATENT DOCUMENTS

| T961,003 | 8/1977 | Krumreich | 179/1 PC |
|---|---|---|---|
| 3,369,214 | 2/1968 | Krumreich et al. | 339/105 |
| 3,850,497 | 11/1974 | Krumreich et al. | 339/176 M |
| 4,103,985 | 8/1978 | Krolak et al. | 339/91 R |
| 4,213,013 | 7/1980 | Perna et al. | 179/1 PC |
| 4,242,721 | 12/1980 | Krolak et al. | 179/98 |

Primary Examiner—John McQuade
Attorney, Agent, or Firm—F. M. Arbuckle; J. R. Hoffman

[57] ABSTRACT

An improved modular interface connector and connector assembly incorporating such connectors for interconnecting telephones and telephone signal equipment, and particularly for electrically connecting multi-conductor cables to a plurality of conductors electrically coupled to telephone signal equipment. The modular connector assemblies of the invention include improved mounting structures which permit each connector to be slidably mounted on a removable support member within an enclosure. The connectors can be mounted on the support member in at least two alternate orientations and retained in any one of a plurality of positions between spaced shoulders of the support member.

20 Claims, 28 Drawing Figures

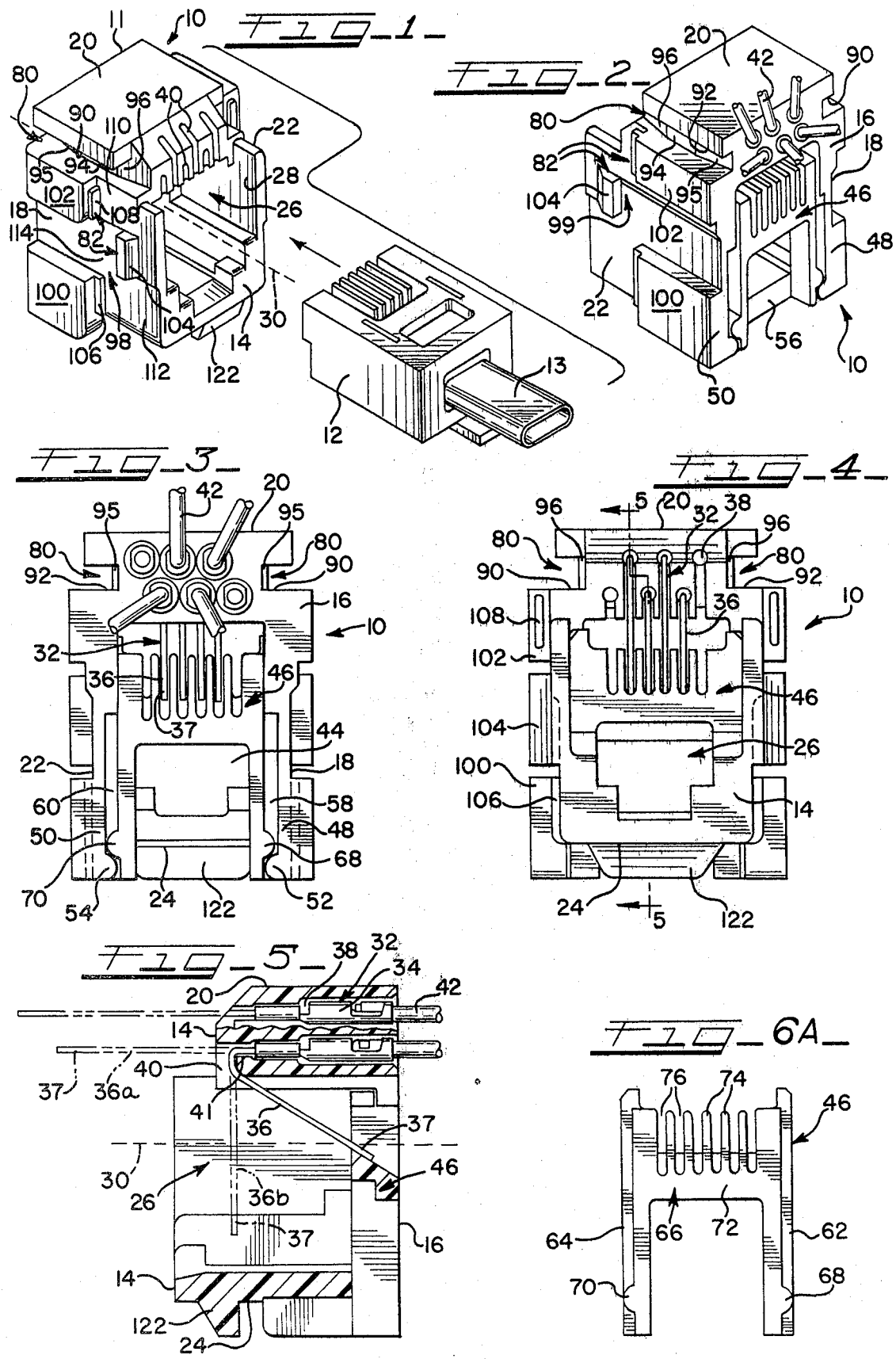

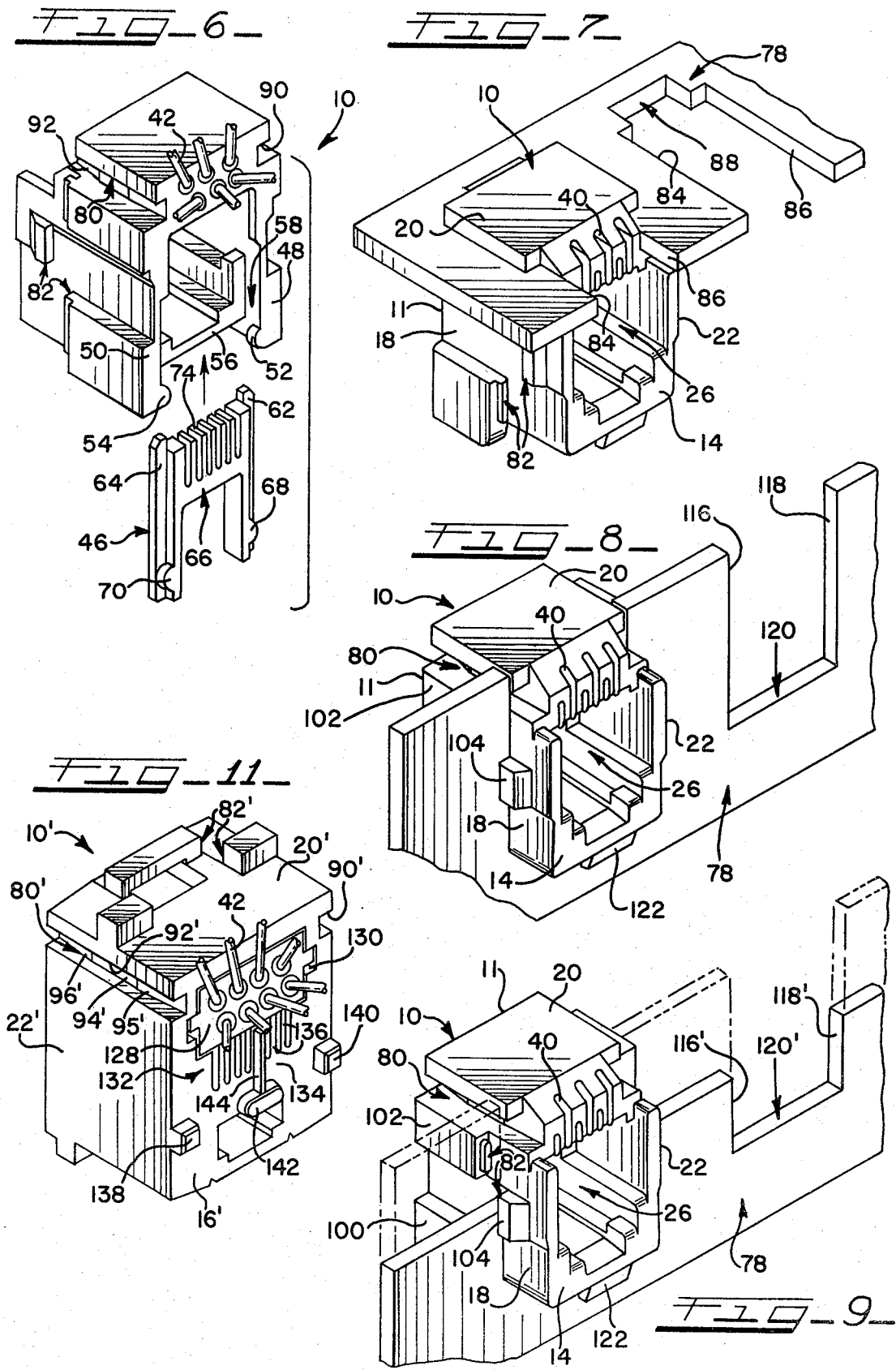

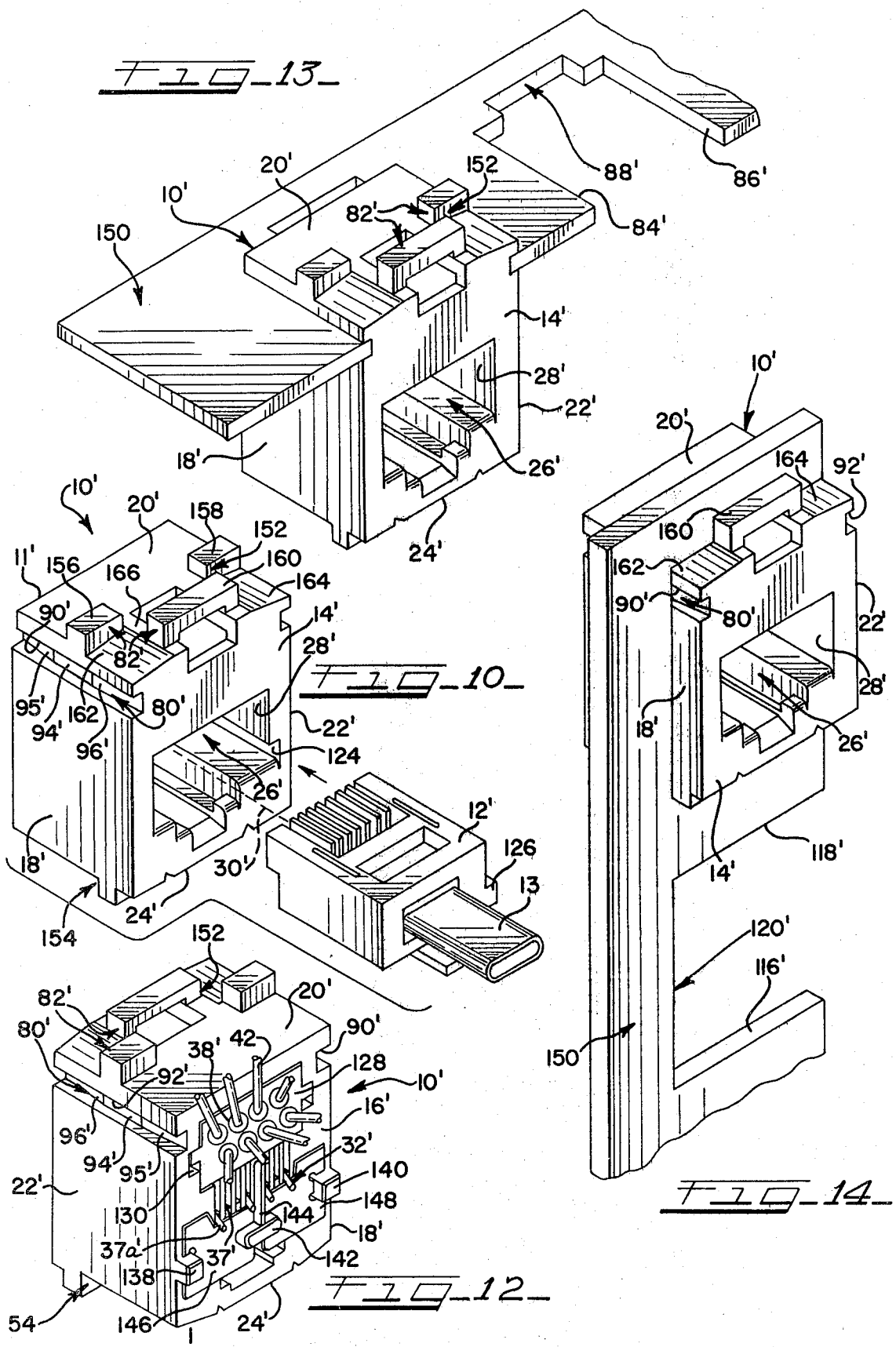

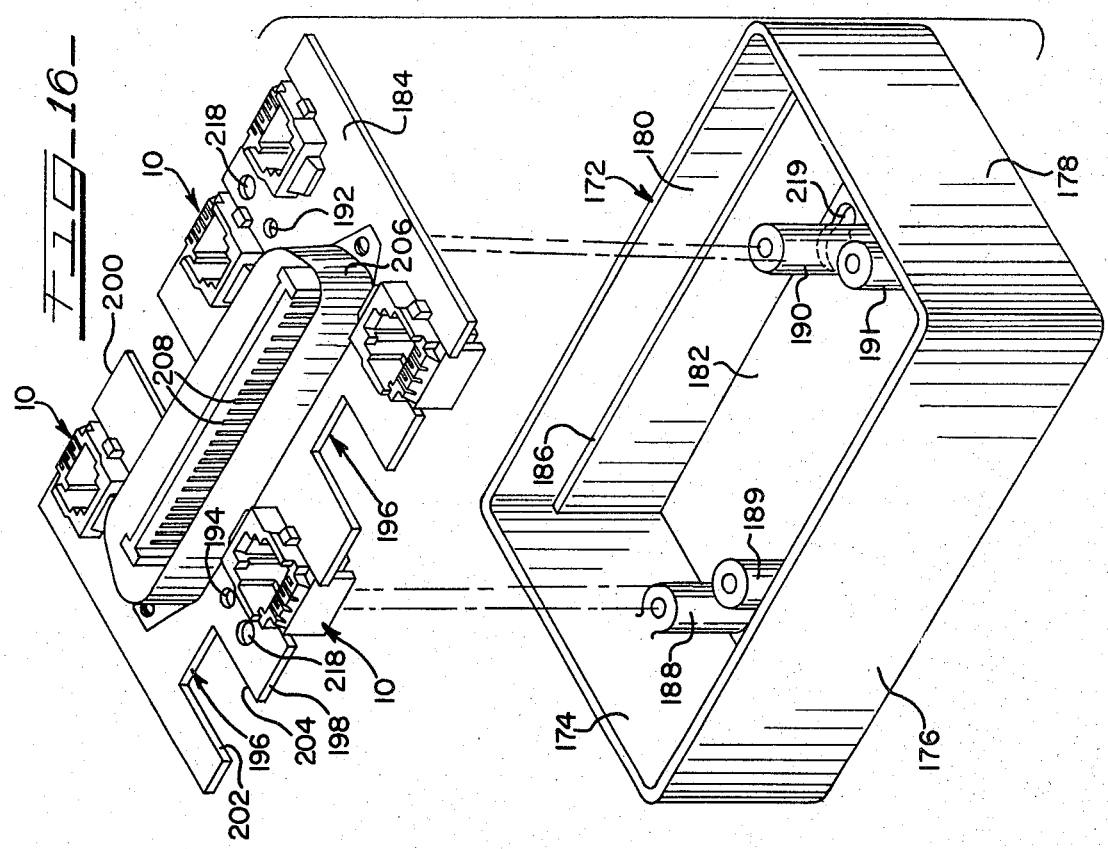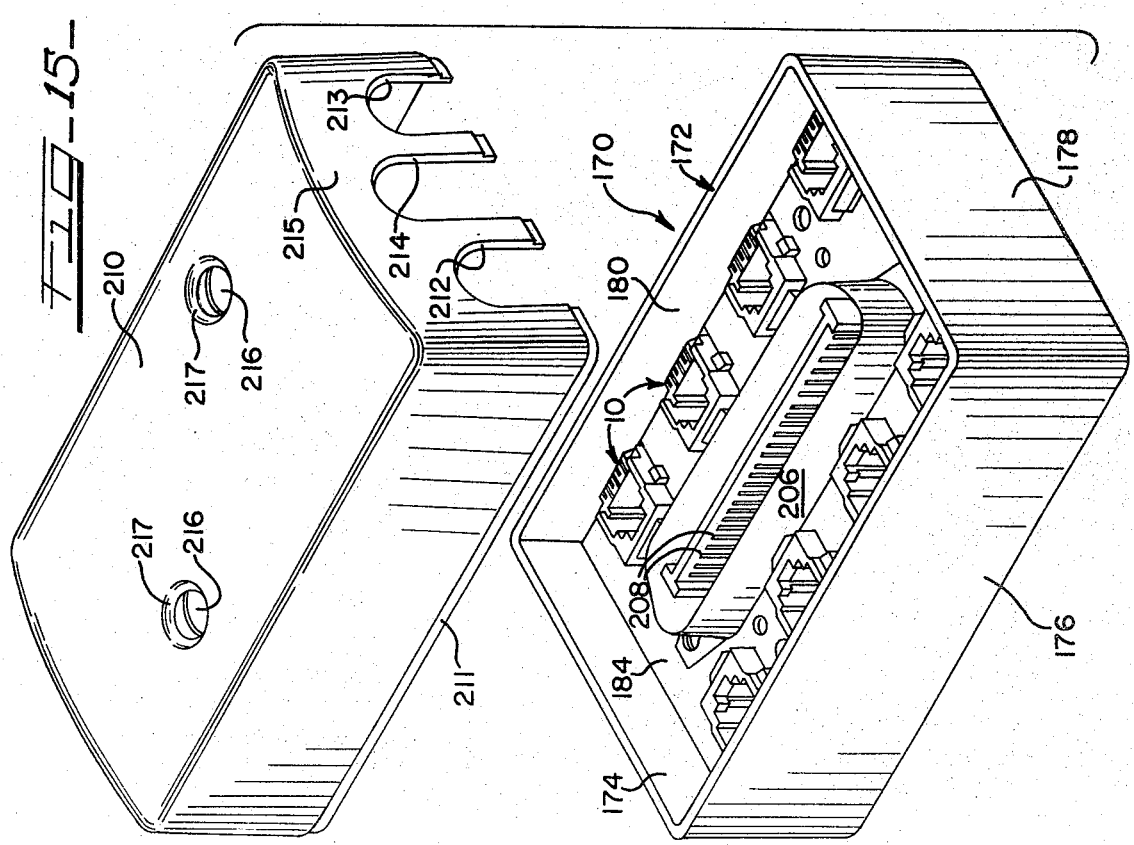

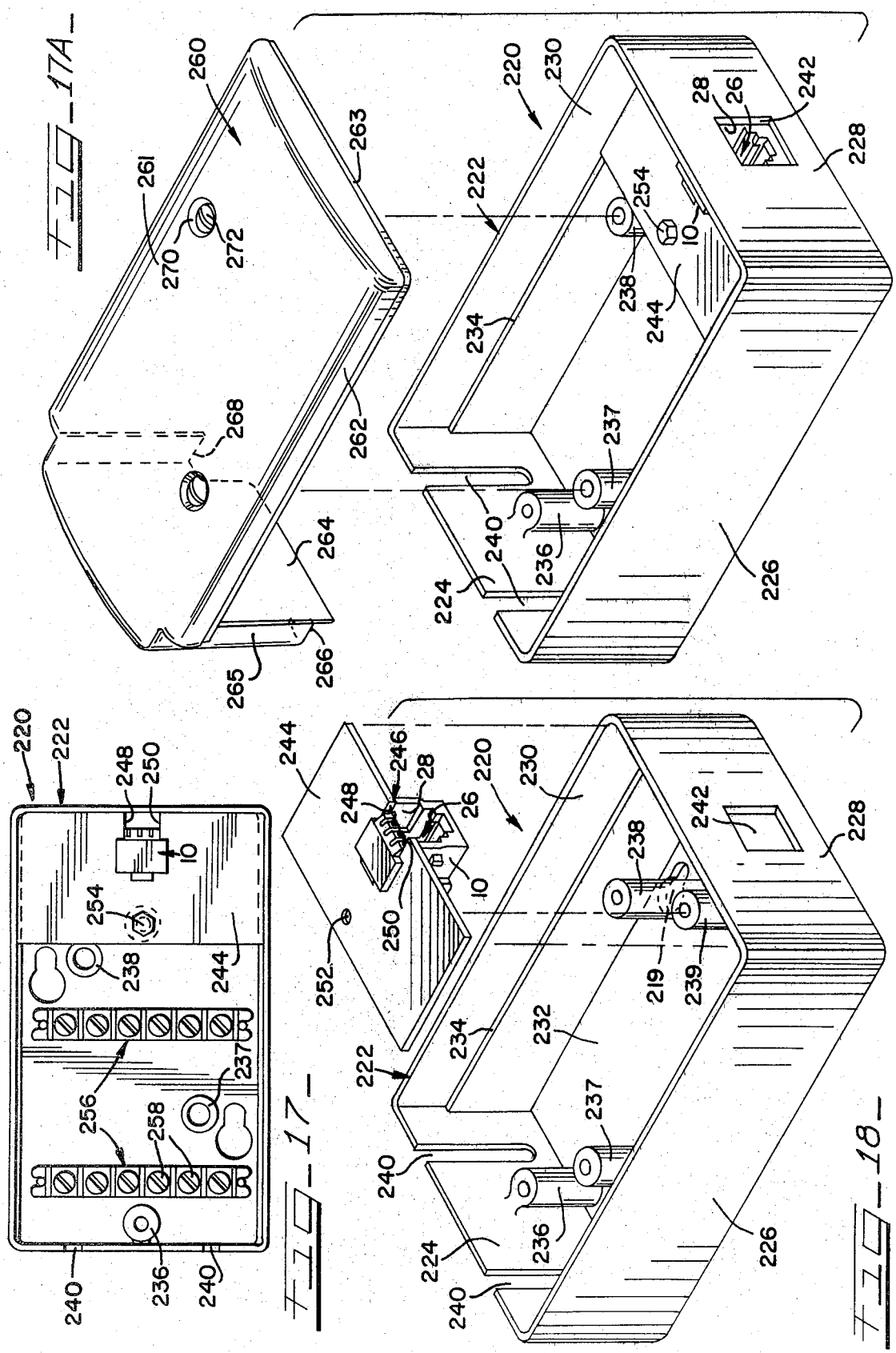

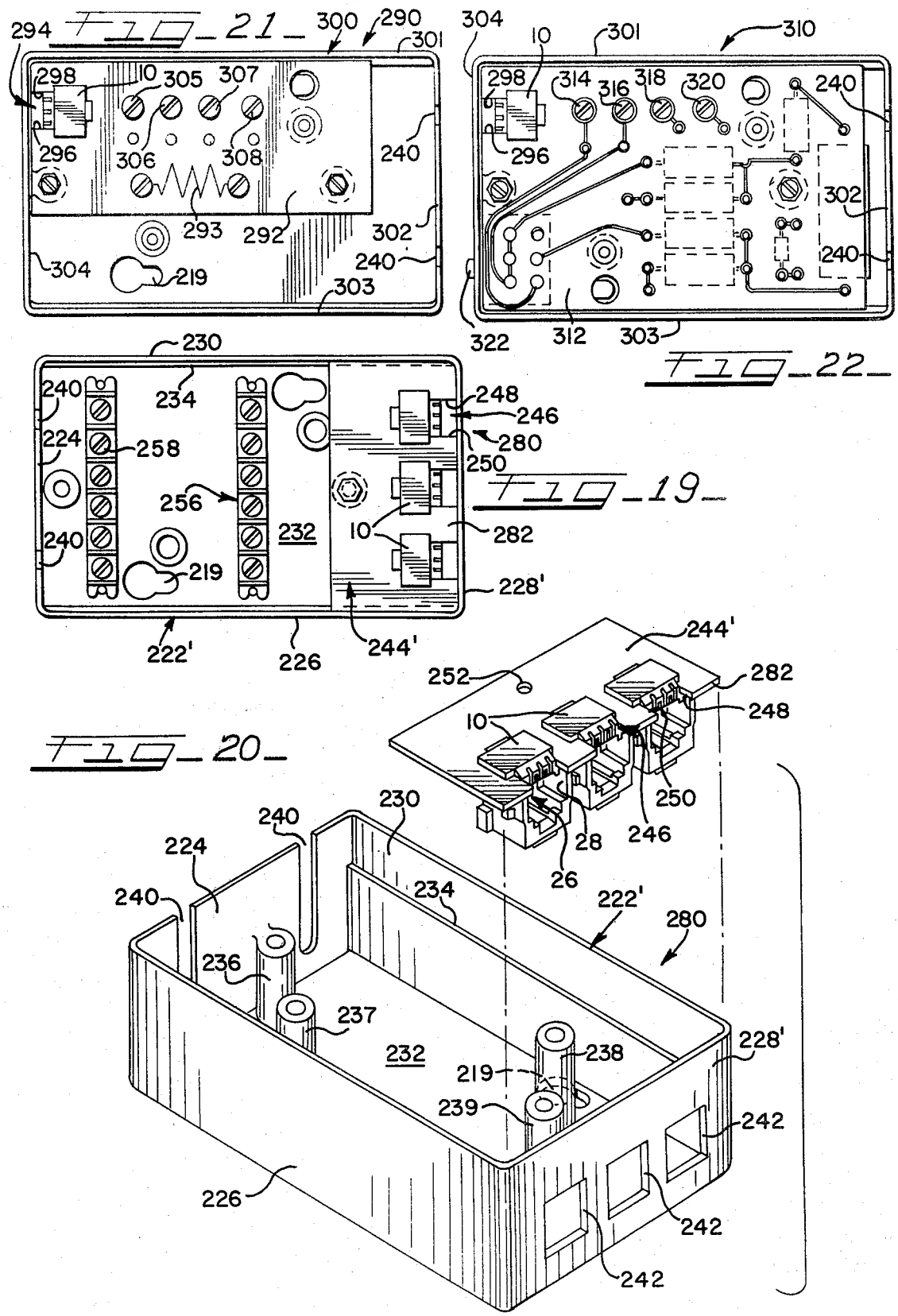

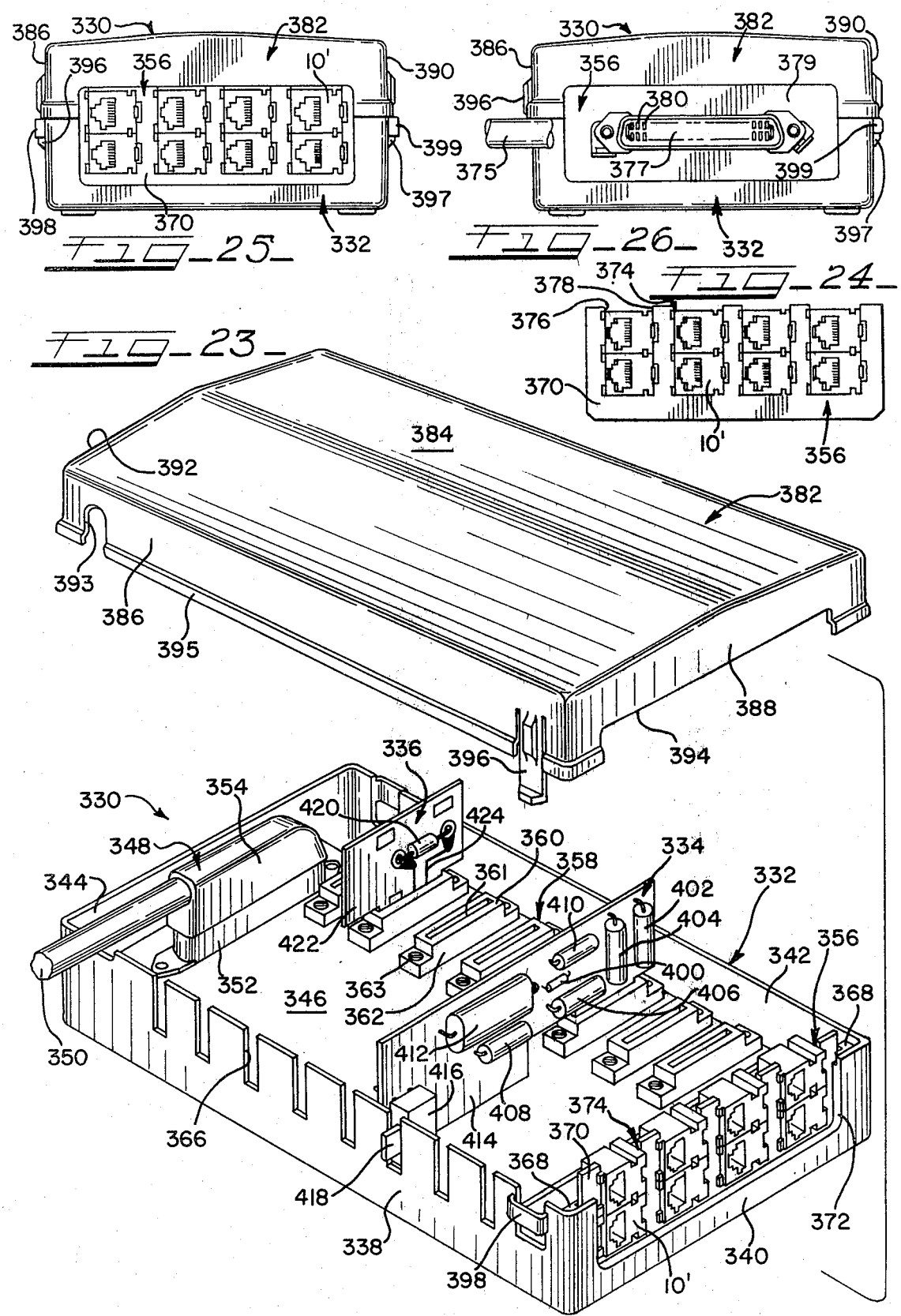

MODULAR INTERFACE CONNECTOR

This is a divisional application of application Ser. No. 902,330, filed May 3, 1978, now U.S. Pat. No. 4,239,316.

RELATED APPLICATIONS

U.S. Patent Applications Ser. No. 770,805, filed Feb. 22, 1977 (now U.S. Pat. No. 4,103,985) by Ronald F. Krolak et al, Ser. No. 843,922, filed Oct. 20, 1977 by Ronald F. Krolak et al, and Ser. No. 843,923, filed Oct. 20, 1977 (now U.S. Pat. No. 4,242,721) by Ronald F. Krolak et al, all three applications being assigned to the assignee of the present invention.

BACKGROUND OF THE INVENTION

This invention relates generally to electrical connectors and more particularly to improved modular interface connectors and connector assemblies incorporating such modular connectors. Specifically, the present invention relates to improved modular jack connectors which are slidably mountable in various orientations in a support member which likewise is mountable in various orientations and configurations within connector assembly enclosures. These variable arrangements permit use of easily assemblable and interchangeable connector assembly component parts to facilitate efficient interconnection of remote signal stations, such as individual telephone receivers, to central signal processing systems, such as telephone signal equipment.

Historically, telephone installation and repair has required the services of a skilled telephone technician to perform customized on-site wiring, splicing, and assembly, as well as interconnection of non-mating components through the exercise of personal ingenuity. Moreover, the proliferation of different species of telephone connector hardware has required that technicians be familar with the peculiarities in wiring requirements for a wide variety of connectors, adapters, and various other connector assemblies, and that the telephone companies maintain correspondingly large part inventories. In an attempt to reduce rising labor and part inventory costs, considerable emphasis has been focused on the development of standardized or modularized telephone cables, connectors, adapters and other connector assemblies so that installations may readily be made by a less skilled technician and in some cases by the customer himself.

One form of modular connector that has been developed in response to this need is disclosed in U.S. Pat. No. 4,070,548. This particular connector is in the form of a modular jack and may be slidably mountable to a support platform or the like. Similar modular jack connections are becoming standard telephone system components and are disclosed in the Federal Communications Commission Regulations published in the Federal Register, Monday, July 12, 1976. While such slidingly mountable modular jacks have proven useful, their mounting features limit the orientation and arrangement capabilities of a plurality of such modular jacks within a single connector assembly, thereby limiting the range of flexibility affordable to connector assemblies incorporating such prior connectors. In an attempt to overcome such limitations, a snap-in modular jack connector was developed and is disclosed in U.S. Pat. Nos. 4,103,985 and 4,242,721 and U.S. Patent Application Ser. No. 843,922 (now abandoned), all by Ronald F. Krolak and assigned to the assignee of the present invention.

In addition to the snap-in modular connector, the aforementioned U.S. patent applications also disclose a variety of adapter and bridging connector assemblies incorporating such snap-in connectors for interconnecting at least one multiconductor cable engaged to a remote signal station, such as a single telephone unit, to a central signal processing system, such as telephone signal equipment or a telephone central office. In addition, such connector assemblies can take the form of modems and data sets wherein impedance networks are included within the connector assembly for controlling the attenuation levels between the remote signal stations and the central signal processing system and are specifically disclosed in the aforementioned patent application Ser. No. 843,922. For the purpose of background of the present invention and for a more detailed disclosure of impedance networks and basic connector assemblies disclosed and claimed in the present invention, the aforementioned patent application and U.S. Pat. Nos. 4,103,985 and 4,242,721 are hereby specifically incorporated by reference.

A distinct problem with the above referenced snap-in modular connectors, however, is that either the assembly enclosure components which receive the connectors must be precisely modified, or the sidewalls of the modular connectors must be flexible, both of which are highly undesirable. Furthermore, to provide flexibility in the connector sidewalls, the snap-in connector module must be undesirably lengthened.

As is clear from the above, then, a continuing problem with present connectors and connector assemblies is that a wide variety of assembly component parts are still necessary to meet different connection requirements inasmuch as different connector assemblies, such as adaptors, bridging assemblies, data sets, junction assemblies, and the like, having non-interchangeable components are required for various different connection purposes. The present invention is designed to achieve the goal of providing a slidingly mountable modular connector capable of fabrication in a single-action mold as well as easy installation and replacement coupled with reliable operation. Furthermore, the modular connector of the invention and the associated connector assemblies incorporating the same way may be creatively arranged to provide a wide range of flexibility in the interfacing connections with existing telephone system equipment and suitability for new installations, while simultaneously retaining simplicity in installation and a relatively modest initial manufacturing cost. Specifically, the present invention is designed to provide a universal connector mounting arrangement whereby the improved modular connectors of the invention may be arranged and mounted within a variety of connector assembly arrangements so as to interconnect any number of remote signal stations to a plurality of conductors leading to a central signal processing system while providing the capability of including impedance networks in such interconnections.

SUMMARY OF THE INVENTION

Therefore, the present invention is directed to an improved modular interface connector which meets the aforementioned requirements and overcomes the above-described deficiencies and problems of prior modular jack connectors, and to novel connector assemblies incorporating such improved interface connectors to provide a wide variety of system applications for interconnecting one or more multi-conductor cables leading to remote signal stations with a plurality of conductors electrically coupled to telephone signal equipment.

It is therefore one object of the present invention to provide an improved modular interface connector and associated connector assemblies incorporating one or more of the modular connectors in unique arrays that facilitate simplified and highly flexible interconnection to varied configurations of telephone system equipment.

It is another object of the present invention to provide an improved modular interface connector having a universal mounting structure which permits slidable mounting of the connector to a support member in a variety of orientations and configurations to enable use of interchangeable and easily assemblable connector assembly parts, thereby facilitating efficient interconnection of one or more multi-conductor cables coupled to remote signal stations to a plurality of conductors connected to a central signal processing system.

A further object of the present invention is to provide an improved interface connector having a removable barrier structure whereby the contact elements of the conductor may be mounted in the connector followed by insertion of the barrier structure to prohibit access to the free ends of the contact elements from the connector housing aperture.

It is yet another object of the present invention to provide an improved modular interface connector wherein each connector is slidably mountable along any position between two spaced shoulders of a support member and may be retained in any such selected position by means integral with the connector, and wherein the connector housing, mounting structure and retention means all comprise an integral molded plastic unit configured to permit fabrication thereof in a single-action mold.

Still another object of the present invention is to provide an improved modular interface connector having means for readily press-mounting a bus bar member against the connector housing for engagement with selective contact elements of the connector.

Accordingly, the present invention is directed to an improved modular interface connector or jack and to connector assemblies which advantageously utilize the improved modular jack for interconnecting remote signal stations such as telephone units with a central signal processing system such as a telephone central office. More specifically, the modular interface connector of the present invention includes a housing having a front wall with a plug receiving aperture therein, a back wall and a plurality of sidewalls which define a cavity for receiving a mating electrical connector in the form of a plug. Disposed within the connector housing are a plurality of contact elements which include active contact portions projecting into the cavity for electrical engagement with the mating plug.

The connector housing of the invention includes an improved mounting structure which permits the connector to be slidably mounted between spaced shoulders of a support member. The mounting structure includes a first mounting means disposed on one pair of oppositely facing sidewalls for slidably mounting the connector housing in the support member at any selected position between the shoulders. The first mounting means are configured such that when the connector is mounted therewith, the central axis of the connector cavity which is normal to the plug entrance aperture is aligned in a first direction relative to the plane defined by the shoulders, which is also generally the plane defined by the support member. Second mounting means are also disposed on a pair of oppositely facing connector sidewalls for slidably mounting the housing in the support member at any selected position between the shoulders. The second mounting means are configured such that when the connector is mounted therewith, the central axis of the connector cavity is aligned in a second direction relative to the plane of the shoulders which is substantially perpendicular to the first direction. In addition, each of the first and second mounting means includes integral retention means for firmly maintaining the housing in any selected position between the pair of shoulders.

In preferred form, the first and second mounting means each include mounting channels disposed opposite each other on oppositely facing sidewalls and are adapted to slidably receive the shoulders of the support member therein, the support member preferably being a printed circuit board or the like. The first mounting direction is preferably substantially parallel to the plane of the shoulders while the second direction is substantially perpendicular to the plane. The retention means preferably include integral projection members disposed within the mounting channels and are adapted to biasly engage and firmly maintain the shoulders within the channels. The connector housing, mounting means and retention means all preferably comprise an integral plastic molded unit configured to permit fabrication of the unit in a single-action mold.

The modular interface connector of the present invention may also include a removable barrier member which is preferably in the form of a comb member having a plurality of teeth for separating and aligning the active contact portions of the contact elements within the connector cavity and for preventing access through the entrance aperture of the cavity to the free ends of the active contact portions. The comb member is adapted to be releasably engageable with the housing to permit prior mounting of the contact elements within the connector housing.

In another embodiment, the modular interface connector of the invention may include an integral comb member and a removable insert member for mounting the contact elements to the connector housing. In addition, a plurality of embossments are disposed on the connector housing for engaging and mounting a pair of bus bar members to the housing adjacent the integral comb member for electrically shorting selective contact elements to create electrical circuits therebetween.

The invention further provides a connector assembly incorporating the above-described modular interface connector for electrically connecting at least one multi-conductor cable to selected ones of a plurality of conductors electrically coupled to telephone signal equipment, each multi-conductor cable having a modular connector component on one end thereof. The connector assembly includes an enclosure defined by a plurality of wall members, and a removable support member is supported within the enclosure and includes at least one pair of spaced mounting shoulders. In one form of the invention, the removable support member is a printed circuit board having at least one recessed portion therein, the opposing side edges of the recessed portion forming the spaced mounting shoulders.

The connector assembly also includes at least one of the improved modular interface connectors slidably mounted in the support member at any selected position between the shoulders of one of the pair of mounting shoulders, the central axis of the interface connector's cavity being either perpendicular to or parallel with the plane of the support member. Each modular connector is adapted to receive the modular connector component which terminates one multi-conductor cable. The assembly finally includes circuit means for electrically connecting each of the contact elements of each interface connector to selected ones of the plurality of conductors coupled to telephone signal equipment. In one form of the invention, the support member is a printed circuit board with the circuit thereof forming a portion of the circuit means.

The plurality of enclosure wall members preferably include a bottom wall member and a plurality of sidewall members supported substantially perpendicular thereto. In one form of the invention, means are provided for mounting the support member substantially parallel to and spaced from the bottom wall member with the central axis of the interface connector cavities being aligned either perpendicular to or parallel with the support member. When the cavities are aligned parallel with the support member, at least on enclosure wall member includes at least one aperture for alignment with each connector cavity to provide access thereto for engagement with the modular connector component of one multi-conductor cable.

In one form of the above connector assembly, the circuit means include multiple contact means which are electrically engageable with the plurality of conductors coupled to telephone signal equipment and selectively connected to the contact elements of each of the interface connectors. The multiple contact means may take the form of a terminal contact strip mounted to the inner surface of the enclosure bottom wall, of a plurality of terminal contact elements disposed on a printed circuit board support member, or of a modular multiple contact connector component mounted to the support member and which is engageable with a mating connector component which terminates the plurality of conductors connected to telephone signal equipment.

The present invention also provides yet another electrical connector assembly embodiment for selectively interconnecting at least one remote signal station having a predetermined signal characteristic to a central signal processing system. This connector assembly embodiment includes an enclosure defined by a plurality of wall members including a bottom wall member and a plurality of sidewall members. Disposed within the enclosure are first multiple contact means which include a first plurality of contact elements electrically engageable with the central signal processing system. A support member is releasably mounted within the enclosure spaced from and substantially parallel to the inner surface of one of the sidewall members, which sidewall member includes an opening to provide access to the support member. Second multiple contact means are mounted to the support member within the enclosure and include a second plurality of contact elements which are electrically engageable with the remote signal station, access to the second multiple contact means being provided by the opening in the one sidewall member. In one form of this embodiment, the second multiple contact means include a plurality of the modular interface connectors of the present invention. A plurality of intermediate multiple contact means are also disposed within the enclosure with each of the intermediate multiple contact means including a third plurality of contact elements. At least one impedance network is provided, each being adapted for selective and independent connection to the third plurality of contact elements of one of the intermediate multiple contact means. Finally, circuit means are disposed within the enclosure for interconnecting selected ones of the first, second and third plurality of contact elements for interconnecting a respective given one of the remote signal stations to the central signal processing system as a respective given one of the third plurality of contact elements is coupled to one of the impedance networks.

BRIEF DESCRIPTION OF THE DRAWINGS

The novel features which are believed to be characteristic of the present invention are set forth in the appended claims. The invention itself, however, together with further objects and and attendant advantages thereof, will become apparent and best understood by reference to the following detailed description taken in connection with the accompanying drawings, setting forth by way of illustration and example certain embodiments of the invention in the several figures of which like reference numerals identify like elements, and in which:

FIG. 1 is a front perspective view of one embodiment of a modular interface connector of the present invention and illustrating a typical mating connector component therefor;

FIG. 2 is a rear perspective view of the modular interface connector illustrated in FIG. 1;

FIG. 3 is a rear elevation view of the modular interface connector illustrated in FIG. 2;

FIG. 4 is a front elevation view of the interface connector illustrated in FIG. 2;

FIG. 5 is a cross-sectional view taken substantially along line 5—5 of FIG. 4;

FIG. 6 is a rear perspective view similar to FIG. 2 but illustrating the removable comb member of the connector in a disengaged position;

FIG. 6A is a rear elevation view of the removable comb member illustrated in FIG. 6;

FIG. 7 is a front perspective view illustrating the interface connector embodiment of FIG. 1 slidably mounted to a support member in a first position;

FIG. 8 is a view similar to FIG. 7 but illustrating the interface connector mounted to a support member in a second position;

FIG. 9 is a front perspective view similar to FIG. 8 but illustrating the interface connector mounted to a support member in a third position;

FIG. 10 is a front perspective view of another embodiment of a modular interface connector of the present invention and illustrating a typical mating connector component therefor;

FIG. 11 is a rear perspective view of the interface connector illustrated in FIG. 10;

FIG. 12 is a rear perspective view similar to FIG. 11 but illustrating a bus bar member engaged to the rear wall of the interface connector;

FIG. 13 is a front perspective view of the interface connector of FIG. 10 slidably mounted to a support member in a first position;

FIG. 14 is a view similar to FIG. 13 but illustrating the interface connector mounted to a support member in a second position;

FIG. 15 is a perspective view of one embodiment of a connector assembly of the present invention incorporating the slidingly mountable interface connector of FIG. 1 therein and illustrating a cover in spaced relation thereto;

FIG. 16 is an exploded perspective view of the connector assembly of FIG. 15 illustrating the assembling relationships of the component parts thereof;

FIG. 17 is a top plan view of a second embodiment of a connector assembly of the present invention and illustrating terminal strips mounted to the bottom wall thereof;

FIG. 17A is a front perspective view of the connector assembly embodiment illustrated in FIG. 17 without the terminal strips and showing a cover in spaced relation thereto;

FIG. 18 is an exploded front perspective view of the connector assembly embodiment of FIG. 17 without the terminal strips;

FIG. 19 is a top plan view of yet another connector assembly embodiment of the present invention similar to the embodiment illustrated in FIG. 17 but including three modular interface connectors incorporated therein;

FIG. 20 is an exploded front perspective view of the embodiment illustrated in FIG. 19 but without the terminal strips;

FIG. 21 is a top plan view of another connector assembly embodiment of the present invention illustrating an impedance network having a single impedance circuit as a support member for the modular connector;

FIG. 22 is a top plan view of another connector assembly embodiment of the present invention similar to FIG. 21 but illustrating an impedance network having selectively alternate impedance circuits as the support member for the modular connector;

FIG. 23 is a perspective view of still another connector assembly of the present invention incorporating a plurality of the modular interface connectors of FIG. 10 and illustrating a cover in spaced relation thereto;

FIG. 24 is a front elevation view of the connector assembly of FIG. 23;

FIG. 25 is a front elevation view similar to FIG. 24 and illustrating the cover mounted to the connector assembly; and FIG. 26 is a front elevation view similar to FIG. 25 but illustrating an alternate form of the connector assembly.

DETAILED DESCRIPTION OF THE PREFERRED EMBODIMENTS

The present invention is directed to an improved modular interface connector and connector assemblies therefor. Referring now to FIGS. 1–5, a modular interface connector 10 is shown in the form of a modular jack and is adapted for mating engagement with a modular connector component 12 constructed in the form of a plug and terminating a multi-conductor cable 13. The plug 12 and the basic structure of the jack 10 are known in the art and are described in the previously referenced patents, patent applications and Federal Communications Commission's Regulations. Specifically, the connector 10 includes a housing 11 having a front wall 14, a back wall 16, and a plurality of sidewalls 18, 20, 22 and 24. In the illustrated embodiment, the sidewall 20 forms a top wall while the sidewall 24 forms a bottom wall. The plurality of walls 14-24 define an interior cavity 26 which is accessible through an aperture 28 disposed in the front wall 14. The cavity 26 is sized and shaped to receive and mate with the plug 12 along a central axis 30 which is normal to the aperture 28. As described in greater detail below, the housing 11 and its component parts are preferably an integral molded plastic structure which is configured in such a manner as to permit its fabrication in a single-action mold as opposed to a double, side action mold of the prior art.

The connector 10 includes a plurality of contact elements 32 with each contact element 32 including a terminal portion 34 and an active contact portion 36 having a free end 37. In the illustrated form of FIGS. 1–5, there are preferably six contact elements 32. Each terminal portion 34 is supported within a longitudinal socket 38 disposed in the top wall 20, and each active contact portion 36 projects into the cavity 26 in the manner described below. A plurality of grooves 40 are formed at the forward end of each top wall 20 along a portion of the front wall 14. Each groove 40 originates at the forward end of one socket 38 and extends downwardly toward the bottom wall 24 to communicate with the cavity 26. Each groove 40 functions as a guide for a contact element 32 as well as forms a ledge 41 which is utilized as a fulcrum when bending the contact element 32 as described below.

Referring more particularly to FIG. 5, the contact elements 32 are mounted in the connector 10 by first terminating the conductors 42 to the terminal portions 34 and then inserting the straight elongated active contact portions 36a through the sockets 38 until they project outwardly from the front wall 14. The free end 37 of each active contact portion 36a is then bent downwardly and rearwardly against the ledge 41 toward the back wall 16, as illustrated at 36b, until the active contact portion 36 projects angularly into the cavity 26 toward the back wall 16. This procedure is followed for all six contact elements 32 with the grooves 40 providing initial guidance of and separation between the plurality of contact elements 32. A comb structure, to be described in greater detail below, provides additional separation of the active contact portions 36 within the cavity 26.

Referring more particularly to FIGS. 2, 3, 6 and 6A, the back wall 24 of the connector 10 includes an aperture 44 wherein a barrier member in the form of a removable comb member 46 is disposed. The comb member 46 is releasably engageable with the housing 11 and functions to separate and align the free ends of the active contact portions 36 within the cavity 26 as well as to prevent access to the free ends 37 of the active contact portions 36 through the aperture 28. More particularly, the back wall 16 includes a pair of depending side elements 48, 50 which include at their lower ends a pair of inwardly projecting knobs 52, 54. An inner surface 56 is formed within the cavity 26 spaced from the back wall 16. The back wall 16, the knobs 52, 54 and the inner surface 56 define a pair of channels 58, 60 which slidably receive the comb member 46.

The comb member 46 preferably includes two elongated side elements 62, 64 which are interconnected by a comb 66. The lower portions of the side elements 62, 64 are sufficiently resilient for biased movement toward each other and include a pair of outwardly projecting knobs 68, 70 disposed toward the lower ends thereof. The elongated side elements 62, 64 are sized and shaped for insertion into the channels 58, 60. As the side elements 62, 64 move longitudinally within the channels 58, 60, the knobs 52, 54 engage the knobs 68, 70 and bias the side elements toward each other until the knobs 68, 70 slide over and nest above the knobs 52, 54. The comb member is thus maintained in an engaged position within the housing 11 by the nested engagement of the knobs 68, 70 with the knobs 52, 54. To disengage the comb member 46 from the housing 11, the lower portions of the side elements 62, 64 are biased toward each other until the knobs 68, 70 are moved past the knobs 52, 54 while the comb member 46 is slidably moved out of engagement with the channels 58, 60.

The comb 66 includes a base member 72 and a plurality of teeth 74 projecting upwardly therefrom substantially parallel with the side elements 62, 64. The teeth 74 are spaced a sufficient distance so that each active contact portion 36 passes into a slot 76 between the teeth 74 as the comb member 46 is inserted into the housing 11, the teeth 74 separating and aligning the active portions 36. The comb member 46 is sized and shaped such that the free end portion 37 of each active contact element 36 is biasly engaged against the base member 72 in a slot 76 when the comb member 46 is fully engaged within the housing 11. This results in the free end 37 of the active contact portion 36 being disposed rearwardly of the comb member 46. In this manner, the teeth 74 prevent access to the free ends of the active contact portions 36 from the direction of the aperture 28. This feature of the invention not only insures against inadvertent shorting of the contact elements 32 by separating and aligning the active contact portions 36, but also provides a significant safety factor by preventing the insertion of a finger or other foreign object into the cavity 26 beyond the free ends 37 of the active contact portions 36, wherein lodging or withdrawal of the object would cause injury thereto as well as distort or otherwise damage the contact elements.

Prior known comb arrangements for modular jack connectors have generally been integral structures. The comb member 46, however, is releasably engageable with the housing 11 to facilitate easy and efficient installation of the contact elements 32 in the housing 11 as well as formation of the bent active contact portions 36. If the comb structure is integral with the housing 11, easy insertion and formation of the contact elements 32 is extremely difficult unless an alternate connector structure is utilized wherein the contact elements 32 may be mounted to and formed within a separate structural member which in turn is subsequently mounted to the housing 11, such as in the embodiment described below. However, the removable comb structure as illustrated in FIGS. 1-5 has been found to be less expensive to manufacture as well as providing an easy method of constructing the modular jack 10 and overcomes the prior problem of interference by an integral comb member during formation of the contact elements 32 in the cavity 26.

Referring more particularly to FIGS. 1-4 and 7-9, the connector 10 is slidably mountable to a support member 78 in a variety of positions and in at least two orientations relative to the plane of the support member. This provides a universal mounting structure whereby a number of mounting arrangements may be achieved between the connector 10 and the support member 78, thereby permitting a wide variety of connector assemblies to be constructed in accordance with desired functional requirements as described in greater detail below. To achieve such a universal mounting arrangement, the connector 10 includes a first mounting structure 80 disposed on a pair of oppositely facing connector sidewalls, and a second mounting structure 82 also disposed on a pair of oppositely facing connector sidewalls. Depending upon the desired overall construction and size of the connector 10, the first and second mounting structures 80 and 82 may be disposed on the same or different pairs of oppositely facing sidewalls.

In the illustrated embodiment of FIGS. 1-4 and 6-9, the first and second mounting means 80, 82 are disposed on the same pair of oppositely facing sidewalls 18 and 22 and are adapted to permit connector 10 to be slidably mounted at any selected position between a pair of shoulders 84 and 86 disposed in the support member 78. In the preferred form, the support member 78 consists of a flat board member having at least one and preferably a plurality of recessed portions or notches 88, each recessed portion 88 having a pair of opposed side edges forming the shoulders 84 and 86. The support member 78 may be in the form of a simple support board member, a printed circuit board, or an impedance network having one or more circuits thereon. In addition, the recessed portion 88 may be sized so as to receive one or a plurality of the connectors 10.

The first mounting structure 80 preferably includes a pair of channels 90 and 92 disposed, respectively, on the oppositely facing sidewalls 18 and 22. Each channel 90, 92 is preferably in the form of a groove in its respective sidewall 18, 22 extending between the respective front and back walls 14 and 16, the width of each groove being just slightly greater than the thickness of the support member 78. However, the channels 90, 92 may also be formed in other manners, such as by a plurality of projections or the like.

The bottom surface of each channel 90, 92 includes a raised embossment 94 having inclined sides 95 and 96. Each embossment 94 projects outwardly from the bottom of the channels 90 and 92 for bias engagement against the shoulders 84 and 86 when the first mounting structure 80 is engaged with the recessed portion 88 of the support member 78. The embossments 94 are preferably slightly pliable and capable of cold flowing when subjected to bias engagement between the shoulders 84 and 86. In this manner, the connector 10 may be slidably adjusted to any position between the shoulder members 84 and 86 and be retained at that position by the bias engagement between the embossments 94 and the shoulders 84, 86. It should be noted that the channels 90, 92 of the first mounting means 80 are preferably aligned along a line substantially parallel with the central axis 30 of the cavity 26. Therefore, when the connector 10 is mounted to the support member 78 utilizing the first mounting structure 80, the central axis 30 is substantially parallel with the plane defined by the shoulders 84 and 86, which in the illustrated form is also the plane of the support member 78.

The second mounting structure 82 also includes a pair of channels 98 and 99 disposed on the oppositely facing sidewalls 18 and 22, respectively. The channels 98 and 99 are preferably aligned along lines substantially perpendicular to the central axis 30 of the cavity 26 and extend the entire width of sidewalls 18, 22 between the top wall 20 and the bottom wall 24. Unlike the channels 90 and 92, each channel 98 and 99 is preferably defined by a plurality of projections 100, 102 and 104. The projections 100 and 102 are spaced along the rear portion of the sidewalls 18 and 22, while the projection 104 is aligned with the space between the projections 100 and 102 along the forward portion of the sidewalls 18, 22. In this manner, the projections 100, 102 and 104 may all be formed on the sidewalls 18 and 22 by a single-action mold.

A spacer member 106 is disposed on the forward channel-forming surface of the projection 100 and is provided to permit two significantly different widths of support members 78 to be disposed between the channel-forming surfaces of the projection 100 and the projection 104. In addition, the spacer 106 is also slightly pliable to accommdate support members 78 of slightly variable thicknesses. A pliable tab 108 is disposed on the forward channel-forming surface of the projection 102 and is adapted to biasly engage the support member 78 when the channels 98 and 99 receive a pair of shoulders 84 and 86, as illustrated in FIG. 8.

To retain the connector 10 in its mounted position, the bottom of each channel 98, 99, which is formed by the outer surface of the respective sidewalls 18, 22, biasly engages the support member 78. To achieve such bias engagement, the surfaces 110 and 112 of each channel 98, 99 are inclined to form a land surface 114 which is disposed immediately adjacent the projection 104. The distance between respective land surfaces 114 of the directly opposite channels 98 and 99 is sufficient to create a bias engagement between the land surfaces 114 and the shoulders 116, 118 of the recessed portion 120 in the support member 78. Each land surface 114 is preferably slightly pliable and capable of cold flowing to accept the shoulders 116 and 118. The land surfaces 114 function in the same manner as the embossments 94 of the first mounting structure 80 and thereby constitute retention means for firmly maintaining the connector 10 in its selected position between the shoulders 116 and 118.

As seen in FIG. 8, the channels 98 and 99 are formed to accept a pair of shoulders 116, 118 wherein the connector 10 is inserted entirely within the support member 78. As seen in FIG. 9, however, the connector 10 may be readily inserted into a recessed portion 120' which includes shoulders 116' and 118' substantially shorter in length than the shoulders of the embodiment of FIG. 8. Nonetheless, the connector 10 may be readily inserted therewithin and maintained in place by the bias engagement between the shoulders 116' and 118' and the land surfaces 114 as well as the bias engagement created by the projections 100 and 104 against the support member 78. It should be noted that a mounting bar 122 is also provided on the bottom surface 24 of the connector 10 and is adapted for engagement with the support member 78 between the shoulders 116 and 118. The mounting bar 122 stabilizes the housing 11 relative to the support member 78 to insure proper support of the connector 10 within the support member 78. In addition, the recessed portion 120 may be of sufficient length to mount a plurality of connectors 10 therein along their second mounting structures 82, one atop the other (see FIGS. 23 and 24).

Referring now to FIGS. 10–12, a second embodiment of the present invention is illustrated in the form of a modular interface connector 10'. The connector 10' includes a housing 11' having a front wall 14', a back wall 16', and a plurality of sidewalls 18', 20', 22' and 24', all of which define an interior cavity 26' having a central axis 30'. Access to the cavity 26' is provided through an aperture 28' in the front wall 14'. The cavity 26' is sized and shaped to receive and matingly engage a standard plug connector component 12' which terminates a multi-conductor cable 13. In the illustrated form, the cavity 26' includes a keyway 124 which is adapted to receive a key member 126 disposed on the plug 12'. The keyway 124 and key member 126 prevent improper alignment and engagement of the plug 12' with the cavity 26'.

The modular connector 10' includes a plurality of and preferably eight contact elements 32' which are substantially identical in size and shape to the contact elements 32 of the previously described connector 10. Each of the contact elements 32' includes a terminal portion (not illustrated) and an active contact portion having a free end 37'. In this particular embodiment, the top wall 20' includes a removable insert 128 which is releasably engageable within a chamber 130 located in the wall 20'. The insert 128 includes a plurality of longitudinal cavities 38', the terminal portion of each contact element 32' being mounted within one such cavity 38'. In this manner, the contact elements 32' are removable from the housing 11' as a unit, the active contact portions of the elements 32' projecting angularly into the cavity 26' when the insert 128 is disposed within the chamber 130.

The housing 11' also includes an integral comb member 132 disposed in the back wall 16'. The comb member 132 functions in the same manner as the comb member 46 of the previous embodiment and thus separates and aligns the active contact portions of the contact elements 32' within the cavity 26' while preventing access to the free ends 37' from the aperture 28'. In preferred form, the comb member 132 includes a base portion 134 and a plurality of spaced teeth 136 projecting upwardly therefrom. The contact elements 32' are shaped whereby the free end portions 37' thereof extend between the teeth 136 and are biased against the base 134. This arrangement permits the contact elements 32' to be mounted within the removed insert member 128, the active portions thereof being angularly formed in the same manner as illustrated in the previous embodiment. After mounting and formation of the contact elements 32', the insert member 128 is inserted into the chamber 130 with the active portions of the contact elements 32' being aligned between the teeth 136. By this arrangement, the contact elements 32' may be easily formed and mounted in the connector 10' without interference by the integral comb member 132.

Disposed along the back wall 16' are a plurality of bosses 138, 140 and 142 projecting outwardly therefrom. In the illustrated form, the boss 142 includes an upward extension 144. The bosses 138–142 permit quick locking engagement of the bus bar members 146 and 148 with the housing 11' by the mere pressing of the members 146, 148 against the respective bosses 138–142, the extension 144 insuring proper separation of the bus bar members 146 and 148. When the bus bar members 146 and 148 are to be used, two of the four contact end portions 37a' on each side of the extension 144 are lengthened relative to the free end portions 37' a sufficient amount to permit biased engagement of the lengthened free end portions 37a' with a bus bar member 146 or 148. Thus, two of the free end portions 37a' on each side of the extension 144 are shorted thereby completing an electrical circuit without the presence of the plug 12' in the cavity 26'. This operating mode of the connector 10' is utilized when a connector 10' is electrically connected in series with a telephone unit or the like so that a continuous circuit is available through the connector 10' by way of the bus bar members 146 and 148 regardless of the mating condition of the plug 12' with the connector 10'.

Prior mounting arrangements for bus bar or shorting bar members are of sufficient complexity or size so that only those modular connectors wherein it is specifically intended to utilize such bus bars would be molded to include locking members therefor. The bosses 138, 140, 142 and 144 are of sufficiently small size so that their addition to the connector 10' is of minor expense. In addition, the bosses 138-144 permit easy and rapid engagement and mounting of the bus bar members 146 and 148 to the housing 11' at the face of the comb member 132. Thus, considerable expense is eliminated by requiring the molding of only one type of housing for the connector 10' wherein the bosses 138-144 are included, whereas prior modular connectors required the molding capability for two types of connector housings.

Each connector 10' also includes a first mounting structure 80' and a second mounting structure 82' disposed on respective opposing sidewalls for mounting the connector 10' in a variety of positions and in at least two orientations relative to a support member 150. The first mounting structure 80' is preferably substantially identical to the first mounting structure 80 of the previous embodiment and preferably includes a pair of mounting channels 90' and 92' disposed, respectively, on the oppositely facing sidewalls 18' and 22'. Each channel 90', 92' is preferably in the form of a groove in its respective sidewall 18', 22' extending between the respective front and back walls 14' and 16', the width of each groove being slightly greater than the thickness of the support member 150. However, the channels 90', 92' may also be formed in others manners, such as by a plurality of projections or the like.

The bottom surface of each channel 90', 92' also includes a raised embossment 94' having inclined side portions 95', 96'. Each embossment 94' is adapted for bias engagement against the shoulders 84', 86' of the support member 150 when the first mounting structure 80' is engaged within the recessed portion 88'. The embossments 94' are preferably slightly pliable and capable of cold flow when subject to such bias engagement. As a result, the connector 10' may be slidably adjusted to any position between the shoulder members 84', 86' and be retained at the selected position by the bias engagement between the embossments 94' and shoulders 84', 86'. Furthermore, the channels 90', 92' are preferably aligned along a line substantially parallel with the central axis 30' of the cavity 26'. Therefore, when the connector 10' is mounted to the support member 150 using the first mounting means 80', the central axis 30' is substantially parallel with the plane defined by the shoulders 84' and 86', which in the illustrated form is also the plane of the support member 150.

The second mounting structure 82' of this particular connector embodiment includes a pair of channels 152 and 154 aligned directly opposite each other along the opposing sidewalls 20' and 24', respectively. The channels 152 and 154 are preferably aligned along lines substantially perpendicular to the central axis 30' of the cavity 26' and extend the entire width of the sidewalls 20' and 24' between the sidewalls 18' and 22'. Similar to the previously described embodiment, each channel 152, 154 is formed from a plurality of projections 156, 158 and 160 disposed on the outer surface of the respective sidewall 20', 24'. The projections 156 and 158 are disposed in a spaced relation along the central portion of each sidewall 20' and 24', while each projection 160 is aligned with the space between the projections 156 and 158 toward the forward portion of each sidewall 20', 24'. In this manner, the projections 156, 158 and 160 may all be formed on the sidewalls 20' and 24' by a single-action mold as described below. Furthermore, each projection 160 is spaced from its associated projections 156, 158 a distance slightly greater than the thickness of the support member 150 to define the channels 152 and 154 which snugly receive the shoulders 84' and 86' to mount the connector 10' within the support member 150.

The bottom of each channel 152, 154, which is formed by the outer surface of the respective sidewalls 20', 24', is adapted to biasly engage the support member 150. To achieve such bias engagement, the surfaces 162 and 164 of each channel 152, 154 are inclined to form a land surface 166 relative thereto, the land surface 166 being an extension of the outer surface of the respective sidewall 20', 24' and being disposed immediately adjacent the projection 160. The land surfaces 166 of the directly opposing channels 152 and 154 are spaced a sufficient distance to create a bias engagement between the surfaces 166 and the shoulders 84', 86' when the connector 10' is inserted in the recessed portion 88'. The land surfaces 166 are preferably slightly pliable and capable of cold flow when engaging the shoulders 84', 86'. The land surfaces 166 function in the same manner as the embossments 94' of the first mounting structure 80' and thereby constitute retention means for firmly maintaining the connector 10' at any longitudinal position between the shoulders 84' and 86'.

Referring now to FIGS. 13 and 14, the pair of channels 90' and 92' and the pair of channels 152 and 154 are each adapted to readily accept a pair of shoulders 84', 80' when the connector 10 is inserted entirely within the support member 150. As seen in FIG. 13, the connector 10 may be readily inserted into the recess 88' utilizing the first mounting structure 80' so that the central axis 30' of the cavity 26' is substantially parallel to the support member 150. Referring to FIG. 14, the connector 10' may also be inserted within the support member 150 utilizing the second mounting structure 82' so that the central axis 30' of the cavity 26' is substantially perpendicular to the plane of support member 150. In addition, the recess portion 88' may be of sufficient length (see FIGS. 23-25) to accept a plurality of the conductors 10' utilizing their second mounting means 82', one adjacent the other. As can be appreciated from the description given below, the variety of orientations and positions of the connectors 10 and 10' relative to their respective support members permits the connectors 10 and 10' to be utilized in a wide variety of differing connector assemblies.

An important feature of the above-modular interface connectors 10 and 10' is that each connector housing 11 and 11', including its component parts excepting the contact elements 32, 32' and the removable comb member 46, is preferably an integrally molded unit configured to allow the fabrication thereof in a single-action mold. Prior molded connectors generally included projections or other component parts arranged such that a double-action mold which includes a separate side action mold portion was required to mold the integral unit. However, all the integral component parts of each housing 11 and 11' are arranged to permit a single-action, split mold to be utilized in the fabrication of the housings 11, 11'. This feature simplifies both the construction and operation of the mold and increases the total production capability of each mold, since the amount of time required to mold one unit is less for the single-action mold than is required for a double-action mold. Therefore, the connectors 10 and 10' can be fabricated more rapidly and at less cost than the prior slidable modular interface connectors.

Furthermore, the above-described unique mounting constructions 80, 80', 82 and 82' provide a diversified mounting capability in conjunction with a support member 78, 150. This mounting capability permits a wide variety of connector assemblies having different functions to be constructed from the same basic component parts, and this feature minimizes the manufacturing and assembly costs of such assemblies utilizing the modular connector of the invention, as described in detail below.

Referring now to FIGS. 15 and 16, a connector assembly 170 is illustrated incorporating the modular interface connector of the present invention. The connector assembly 170 is utilized for electrically interconnecting one and preferably a plurality of multi-conductor cables coupled to remote signal stations, such as individual telephone units, to a plurality of conductors which are electrically coupled to a signal processing system such as telephone signal equipment or a central telephone office. Reference should be made to the previously incorporated patent application Ser. No. 843,922 and U.S. Pat. Nos. 4,103,985 and 4,242,721 for details regarding the overall functions of and uses for the assembly 170 as well as the other connector assemblies described herein.

In the illustrated embodiment, the connector assembly 170 includes an enclosure 172 which is defined by a plurality of wall members including sidewall members 174, 176, 178 and 180 projecting substantially perpendicularly from a bottom wall member 182. A removable support member 184 is releasably mountable within the enclosure 172. To firmly support the member 184 within the enclosure 172, ledges 186 are provided along the inner surfaces of the sidewall members 176 and 180, and a plurality of posts 188, 189, 190 and 191 project upwardly from the bottom wall member 182 to engage the bottom surface of the support member 184. In this particular embodiment, the support member 184 is adapted to be mounted substantially parallel to the bottom wall member 182 and is sized and shaped to abut all four sidewall members 174–180. The support member 184 preferably includes a plurality of apertures 192 and 194 which are aligned with apertures in the posts 189 and 190 when the support member 184 is positioned within the enclosure 172. Any known means such as bolts or screws (not illustrated) may be utilized to firmly connect the support member 184 to the posts 189 and 190 through the apertures 192, 194.

The support member 184 includes a plurality of notches or recessed portions 196 disposed along two side edges 198 and 200 thereof for mounting a plurality of modular interface connectors constructed in accordance with the present invention. While the recess portion 196 may be formed in any manner, it is preferred that the portions 196 be punched from a solid support member 184. Each recess portion 196 functions in the same manner as the recessed portion 88 of the previously described connector embodiment and includes a pair of spaced shoulders 202 and 204 for slidably engaging the selected modular connector, which in the illustrated embodiment is a modular connector 10. Each modular connector 10 is preferably mounted within the support member 184 utilizing the second mounting structure 82 so that the central axis of the cavity 26 thereof is substantially perpendicular to the plane defined by the shoulders 202 and 204 and the plane of the support member 184, the second mounting structure 82 being engaged with the shoulders 202 and 204.

Disposed on the central portion of the support member 184 is a multi-contact connector component 206, which in this particular embodiment is preferably an Amphenol 57 or 157 Series connector component manufactured by Amphenol North America Division of Bunker Ramo Corporation. The connector component 206 is securely mounted to the upper surface of the support member 184 and includes a plurality of contact elements 208. In preferred form, each contact element 208 is electrically connected by conductor or circuit means (not illustrated) to a single contact element 32 (FIG. 5) of a connector 10. In this manner, all of the contact elements 32 of the connectors 10 mounted to the support member 184 are selectively electrically connected to the contact elements 208 of the connector component 206.

As illustrated in the previously referenced and incorporated U.S. patent application Ser. No. 843,922, the plurality of conductors coupled to a central signal processing system in the form of telephone signal equipment or a central telephone office (not illustrated) are terminated to another multi-contact connector component which is mateably engageable with the connector component 206. Thus, by engaging the two mateable multi-contact connector components, the conductors coupled to telephone signal equipment are selectively electrically connected to the contact elements 32 (FIG. 5) of the modular connectors 10. As illustrated in FIG. 1, a plurality of mating connector components 12 may be selectably engaged with the modular connectors 10, each connector component 12 terminating an electrical conductor 13 which is coupled to a remote signal station such as an individual telephone unit. Thus, the connector assembly 170 enables the selective interconnection of individual telephone units or remote signal stations having predetermined signal characteristics to a central signal processing system by selectively interconnecting the connector 10 with the multiple-contact connector 206 and by selectively engaging the plugs 12 with the connectors 10. It should be noted that the connector assembly 170 is particularly suitable for use as a bridging adapter assembly, although multiple contact connector means other than connector 206 may be utilized in assembly 170.

As illustrated in FIG. 15, a cover 210 is provided for engagement with the upper edges of the sidewall members 174–180. The cover 210 preferably includes a lower lip 211 to permit firm interengagement of the cover 210 with the enclosure 172. Apertures 212, 213 and 214 are provided in a front wall 215 to permit access by the various conductors to the connector component 206 and the modular connectors 10. Two elongated screws 216 pass through two apertures 217 disposed in the top portion of the cover 210 and pass through two apertures 218 in the support member 184 for engagement with the posts 189 and 190 to firmly secure the cover 210 to the enclosure 172. Key slots 219 are also provided in the bottom wall member 182 for mounting the assembly 170 on a vertical support such as a wall or the like through the use of properly spaced screws or the like.

Referring now to FIGS. 17, 17A and 18, another embodiment of the connector assembly of the present invention is illustrated therein. In this embodiment, a connector assembly 220 includes an enclosure 222 substantially similar to the enclosure 172 of the previous embodiment. The enclosure 222 is defined by a plurality of wall members including sidewall members 224, 226, 228 and 230 mounted substantially perpendicular to a bottom wall member 232. Support ledges 234 are provided on the inner surfaces of the sidewall members 226 and 230, and a plurality of support posts 236, 237, 238 and 239 project upwardly from the bottom wall member 232. The structural differences between the enclosures 222 and 172 (FIG. 16) are that the sidewall member 224 of the enclosure 222 includes two spaced slots 240 aligned substantially perpendicular to the bottom surface 232, and that the sidewall member 228 includes a substantially square viewing aperture 242 disposed centrally therein. The slots 240 and the aperture 242 are preferably formed by punching the solid sidewall members 224 and 228, respectively.

The enclosure 222 further includes a support member 244 which includes one recessed portion 246 having a pair of spaced shoulders 248 and 250. The support member 244 is sized and shaped to be removably engageable with the ledges 234 and the post 239 to be positioned in the forward portion of the enclosure 222 adjacent the sidewall 228. An aperture 252 is provided in the support member 244 and is aligned with an aperture in the post 239, and a screw or bolt 254 passes through the aperture 252 into the post 239 to firmly secure the support member 244 within the enclosure 222. A modular interface connector constructed in accordance with the present invention is mounted within the recessed portion 246 and is preferably in the form of an interface connector 10. In this particular embodiment, the first mounting structure 80 of the connector 10 is engaged with the shoulders 248 and 250 to slidably mount the connector 10 within the recessed portion 246, the central axis of the cavity 26 being substantially parallel to the plane of the support member 244. As can be seen from FIGS. 17A and 18, the aperture 242 is positioned in the sidewall member 228 such that when the support member 244 and the mounted connector 10 are positioned within the enclosure 222, the aperture 28 of the connector 10 is aligned with the aperture 242 so that the central axis 30 of the connector cavity 26 is substantially coaxial with the central axis of the aperture 242. In this manner, the cavity 26 is accessible from the exterior of the enclosure 222 thereby permitting a mating plug 12 to be inserted into the cavity 26 through the apertures 242 and 28 from outside the connector assembly 220.

Referring to the previously referenced and incorporated patent applications, the contact elements of the connector 10 mounted in the enclosure 222 are selectably engaged with a plurality of conductors (not illustrated) coupled to a central signal processing system, such as telephone signal equipment or a central telephone office. These conductors are provided access to the interior of the enclosure 222 through the slots 240. Any known means may be utilized for electrically interconnecting such conductors (not illustrated) with the contact elements of the connector 10. In the embodiment illustrated in FIG. 17, two terminal strips 256 are disposed along the bottom wall member 232, each terminal strip 256 including a plurality of terminal contacts 258. The incoming conductors (not illustrated) are selectively interconnected with the terminal contacts 258, and circuit means (not illustrated) are utilized to interconnect selected terminal contacts 258 with the contact elements of the connector 10, as described in more detail in the heretofore referenced and incorporated patent applications.

The connector assembly 220 also includes a cover member 260 for interengagement with the enclosure 222 to protect the enclosure components from the environment. In this embodiment (FIG. 17A), the cover 260 includes a top member 261 having a plurality of short wall members 262 projecting downwardly from the front and sides thereof. Each wall member 262 includes a lower lip portion 263 for engagement with the sidewall members 226, 228 and 230, respectively. Disposed at the rear of the cover 260 is a back wall member 264 which depends downwardly from a rear extension of the top member 261 and is spaced outwardly from and aligned substantially parallel with the sidewall member 224 of the enclosure 222. The back wall member 264 includes forwardly projecting edge members 265 on the parallel depending edges thereof which extend between the back wall member 264 and the outer surface of the sidewall member 224. Notches 266 and 268 are provided along the bottom portions of the edge members 265 and the bottom outermost sections of the back wall member 264 to provide access to the slots 240 and the interior of the enclosure 222 for the conductors (not illustrated) coupled to telephone signal equipment. In addition, two apertures 270 are disposed in the top member 261 and are aligned with the posts 237 and 238 when the cover 260 is positioned on the enclosure 222. Screws 272 are provided for securing the cover 260 to the posts 237 and 238 to maintain the cover firmly in place on the enclosure 222.

The particular connector assembly 220 illustrated in FIGS. 17, 17A and 18 is especially suitable as an adapter for connecting a single multi-conductor cable secured to a telephone unit and having a modular connector at the end thereof to nonmodular telephone equipment. However, it should be noted that circuit means other than the terminal strips 256 may be utilized with the connector assembly 220 as illustrated below.

Referring to FIGS. 19 and 20, a connector assembly 280 is illustrated and constitutes a slight variation of the connector assembly 220. In the connector assembly 280, an enclosure 222' is provided having the same basic structure of the enclosure 222 of FIG. 18. However, in the enclosure 222', a plurality of the apertures 242 are provided in the sidewall member 228'. Other than this one modification, the enclosure 222' is identical to the enclosure 222 described above. A support member 244' is removably mountable within the enclosure 222' and includes a plurality of the recesses 246 disposed along one side edge 282 adjacent the sidewall member 228'. Each recess 246, as in the previous embodiment, includes a pair of spaced shoulders 248 and 250 for receiving a connector 10. Thus, in this particular embodiment the support member 244' includes three modular interface connectors 10 slidably mounted thereto, the apertures 28 of the connectors 10 being aligned and facing the sidewall member 228'. The apertures 242 are positioned in the sidewall member 228' such that the apertures 28 of the connectors 10 are aligned with the apertures 242 when the support member 244' is mounted within the enclosure 222', the central axis 30 of the cavities 26 being coaxial with the apertures 242. This arrangement provides access to the cavities 26 of the connectors 10 through the apertures 242 for interconnection with a plurality of plug connectors 12 (FIG. 1).

In this particular embodiment, the contact elements 32 (FIG. 5) of the three connectors 10 are electrically engaged by any known circuit means to a plurality of conductors (not illustrated) coupled to telephone signal equipment, slots 240 providing access to the enclosure 222'. FIG. 19 illustrates one embodiment of such circuit means wherein two terminal strips 256 are disposed on the bottom wall member 232 as in the previously described connector assembly 220. In FIG. 19, the contact elements 32 of the connectors 10 are selectively engaged by any desired circuit means to the terminal contacts 258, while the incoming conductors (not illustrated) are also selectively engaged to the terminal contacts 258.

The connector assembly 280 of FIGS. 19 and 20 permits the interconnection of a plurality of multi-conductor cables which are coupled to individual telephone units having predetermined signal characteristics to a central signal processing system. Thus, the connector assembly 280 is particularly adapted to function as a bridging adapter wherein any desired multi-conductor cable may be readily interconnected with any selected incoming conductor simply by modifying the interengagement of the plugs 12 with the connectors 10.

FIG. 21 illustrates yet another embodiment of a connector assembly constructed in accordance with the present invention. In this particular embodiment, a connector assembly 290 is provided having a removable support member 292 in the form of an impedance network with one network circuit. Particular reference is made to the previously incorporated patent applications Ser. No. 843,922 and Ser. No. 843,923 for more specific details regarding the construction and operation of the impedance network of the support member 292. The impedance network 292 includes a recessed portion 294 at one end thereof having a pair of spaced shoulders 296 and 298 adapted for interengaging the first connector structure 80 of a connector 10. It should be noted that the connector 10' may also be utilized in the assembly 290 as well as in all the other described connector assemblies of the present invention.

The connector assembly 290 includes an enclosure 300 having a plurality of sidewall members 301, 302, 303 and 304 similar to the sidewall members of the previously described connector assembly embodiments. The sidewall member 304 includes an aperture (not illustrated) disposed therein for alignment with the connector 10 in the support member 292 for engagement of a plug 12 with the connector 10. The conductor 13 terminated to the plug 12 (FIG. 1) is coupled to an individual telephone unit and the contact elements 32 (FIG. 5) of the connector 10 are selectively electrically coupled to the circuit 293 of the impedance network 292 which is in turn electrically coupled to at least one incoming conductor (not illustrated) leading to a central signal processing system via the terminals 305, 306, 307 and 308 provided on the support member 292. The connector assembly 290 achieves the same basic function as the connector assembly 220 except that the circuit means of the assembly 290 includes an impedance network in the form of the support member 292.

Referring to FIG. 22, yet another connector assembly 310 is illustrated and is substantially similar to the connector assembly 290. However, the assembly 310 includes a support member 312 which is in the form of an impedance network fully mounted between the sidewalls 301, 303 and 304 and which includes two network circuits. The two available circuits of the support member 312 are coupled to the connector 10 and alternatively available for use, and to the incoming conductors (not illustrated) coupled to telephone signal equipment through the terminals 314, 316, 318 and 320. A switch 322 is provided and extends outwardly through the sidewall member 304 for selecting the desired network circuit. Additional details regarding the impedance network 312 can be found in the previously referenced and incorporated patent application Ser. No. 843,922 and U.S. Pat. No. 4,242,721.

Referring to FIGS. 23-26, still another connector assembly embodiment of the present invention is illustrated. In this particular embodiment, a connector assembly 330 is provided for selectively receiving a plurality of impedance networks to permit selective interconnection of a plurality of remote signal stations having predetermined signal characteristics to a central signal processing system. Particular reference is made to the previously referenced and incorporated U.S. Pat. No. 4,242,721, wherein the detailed construction and operation of a connector assembly having a similar construction and identical circuitry arrangements as the assembly 330 is disclosed. The present specification is therefore limited to the differences and improvements provided by the present invention.

The connector assembly 330 includes an enclosure 332 structured to selectively receive a plurality of dual circuit impedance networks 334, which are functionally the same as the impedance networks 312 of FIG. 22, and/or a plurality of single circuit impedance networks 336, which are functionally the same as the impedance networks 292 of FIG. 21. The enclosure 332 is also structured to receive suitable electrical connectors for interconnecting a plurality of remote signal stations to a central signal processing system.

Briefly, each dual circuit impedance network 334 is of the type which includes a first network circuit including a single impedance element 400 which may be utilized for interconnecting a telephone remote signal station to a central signal processing system, and a second network circuit taking the form of an impedance pad circuit having a plurality of impedance elements and which is suitable for interconnecting a modem or data set to a central signal processing system. The first network circuit's single impedance element 400 preferably consists of a one-quarter watt resistor. The second network circuit elements preferably includes four two-watt resistors 402, 404, 406, 408, a one-watt resistor 410, and a capacitor 412. The components of the first and second network circuits are mounted on a substrate comprising a printed circuit board 414 which includes on its under side a deposited lead pattern (not shown) interconnecting the component parts to form the second network circuit or pad circuit and interconnecting the first network circuit single impedance element 400 in circuit. The impedance network also includes a switch 416 mounted on the board 414. The switch 416 is provided to selectively actuate the second network circuit or pad circuit should that mode of operation be desired. The switch 416 preferably includes a control arm 418 which extends beyond the periphery of the board 414.

The board 414 also carries external contacts (not illustrated) which are coupled to portions of the impedance network circuits by the deposited lead pattern on the underside of the board 414. The external contacts are utilized for interconnecting a remote signal station to a central signal processing system in a manner to be more fully described hereinafter.

Each single circuit impedance network 336 is the equivalent of the first network circuit of the impedance network 334. More specifically, the impedance network 336 includes a single resistor 420 mounted on a substrate consisting of a printed circuit board 422. The circuit board 422 includes a deposited lead pattern 424 interconnecting the resistor 420 to external contacts (not illustrated) disposed on the board 422 for interconnecting a remote signal station to a central signal processing system as described below.

The enclosure 332 is preferably defined by a plurality of sidewall members 338, 340, 342 and 344 and a bottom wall member 346. First multiple contact means 348 include a first plurality of contact elements and are disposed within the enclosure 332 for terminating a multi-conductor cable 350 which is coupled to a central signal processing system, such as telephone signal equipment or a telephone central office. In preferred form, the first contact means 348 include two mateable multiple-contact connector components 352 and 354, each having a plurality of contact elements (not illustrated) engageable with the contact elements of its mating connector component. Preferably, the contact means 348 constitute Amphenol 57 or 157 Series connector components or the like. The connector component 352 is mounted to the bottom wall member 346, and the connector component 354 is adapted to terminate the conductors of the cable 350 and to be mounted to and engaged with the connector component 352.

The enclosure 332 also includes a second multiple-contact means 356 having a second plurality of contact elements (not illustrated), and an intermediate multiple-contact means 358 having at least one third plurality of contact elements (not illustrated). The intermediate contact means 358 includes a plurality of intermediate multiple-contact connectors 360 mounted to the bottom wall member 346 adjacent the sidewall member 342. Each of the intermediate connectors 360 preferably includes a rectangular body portion 361 and a base portion 362 which is secured to the bottom wall member 346 by screws 363 or rivets. Each body portion 361 is adapted to receive an impedance network 334 or 336 and contains a third plurality of contact elements for electrical engagement with the appropriate external contacts (not illustrated) of the engaged impedance network 334, 336. Circuit means (not illustrated) are also provided in the enclosure 332 for selectively interconnecting each third plurality of contact elements in said connectors 358 with the first plurality of contact elements in the connector component 352. It should be noted that the switch arm 418 of each impedance network 334 projects through a slot 366 in the sidewall member 338 for access outside the enclosure 332.

To mount the second connector contact means 356 to the enclosure 332, a pair of channel members 368 are disposed along the inside edges of the sidewall member 340 and are adapted to slidingly receive a support member 370 therein. The channel members 368 are arranged to mount the support member 370 spaced from and parallel with the inner surface of the sidewall member 340. The second contact means 356 are disposed on the support member 370 as described below, and an opening 372 is located in the sidewall member 340 to provide access to the second contact means 356 from outside the enclosure 332.

In one form of this embodiment, as illustrated in FIGS. 23-25, the second contact means 356 consists of a plurality of the modular interface connectors 10', although the connector 10 may also be readily utilized. The support member 370 includes a plurality of recessed portions 374 each having a pair of spaced shoulders 376, 378 for slidably receiving the second mounting structure 82' of each connector 10'. Each recessed portion 374 is preferably adapted to receive at least two connectors 10' mounted adjacent each other with their cavities 26' facing the opening 372. Thus, each connector 10' is accessible from outside the enclosure 332 for engagement with a plug 12' terminating a conductor 13 (FIG. 10) coupled to a remote signal station such as an individual telephone unit. Circuit means (not illustrated) are provided in the enclosure 332 to electrically engage the second contact elements (not illustrated) of each connector 10' to the plurality of third contact elements of one intermediate connector 360 to thereby electrically couple each connector 10' to the central signal processing system by way of an intermediate connector 360 and the first contact means 348. It should be noted that the support member 370 is removably engageable with the channels 368 to permit substitution of alternate forms of second contact means 356 as described below.

The above embodiment is particularly useful when interconnecting individual telephone unit conductors directly to the cable 350. However, in certain instances the individual telephone unit conductors 13 (FIGS. 1 and 10) have already been interconnected to a single multi-conductor cable 375 through use of adapters such as those illustrated in FIGS. 15 and 20, although the signals therefrom have not yet been attenuated. To attenuate the signals from individual telephone units and to interconnect such units with a central signal processing system, an alternate form of the second contact means 356 is illustrated in FIG. 26.

In this form of the invention, the contact means includes a multi-contact element connector component 377 mounted to a support member 379. The connector component 377 is preferably an Amphenol 57 or 157 Series connector component which is mateable with another connector component (not illustrated) which terminates the cable 375 carrying the conductors coupled to the individual telephone units. The support member 379 is slidably mountable in the channels 368 similar to the support member 370, the contact elements 380 of the component 377 being accessible for mating engagement through the opening 372. Circuit means are also provided in the enclosure 332 for electrically interconnecting selected contact elements 380 with appropriate third pluralities of contact elements of the intermediate connectors 360 to interconnect the connector component 377 with the first contact means 348 and a central signal processing system.

Referring to FIGS. 23, 25 and 26, a cover 382 is provided for engaging the enclosure 332 to protect the components thereof from environmental contamination and the like. The cover 382 preferably includes a top member 384 and a plurity of depending sidewalls 386, 388, 390 and 392. The sidewall 386 includes a notched opening 393 to provide an exit port from the enclosure 332 for the cable 350. The sidewall 388 includes an opening 394 which cooperates with the opening 372 when the cover 382 is engaged with the enclosure 332 to provide access to the second contact means 356. In addition, an outwardly protruding lip member 395 is disposed on the lowermost edges of the sidewalls 386–392 to engage the enclosure sidewall members 338–344, respectively. Finally, to removably lock the cover 382 in position on the enclosure 332, a pair of resilient latch members 396, 397 are disposed, respectively, on the sidewalls 386 and 390 for latching engagement with a pair of catches 398 and 399 disposed on the sidewall members 338 and 342, respectively.

The connector assembly 330 is pre-wired as discussed above and as specifically disclosed in the afore-referenced U.S. Pat. No. 4,242,721, and with the conductive lead pattern of the printed circuit board 414 interconnecting the various elements thereon, all of the requirements found in the rules and regulations, Appendix A-59, appearing in the Federal Register, Vol. 41, No. 134, dated Monday, July 12, 1976, will be satisfied. Also, those requirements are satisfied at the instant the circuit board 414 or 422 is interconnected with an intermediate connector 360. Therefore, the interconnections between a remote signal station and a central signal processing system can be achieved with the present invention without on-site installation wiring.

The present invention, therefore, provides improved modular interface connectors and unique connector assemblies incorporating such improved connectors. The modular connectors of the invention include universal mounting structures which permit the connectors to be slidably mounted in various configurations, orientations and arrangements to satisfy a number of diverse connection requirements. In addition, the connectors of the invention and their mounting structures can be molded in a single-action mold to thereby reduce the costs of manufacture. Furthermore, a unique comb structure and a simplified bus bar mounting structure are provided which simplify the fabrication of the connectors and thereby further reduce the cost of manufacture.

The improved connector of the invention also permits the construction of a wide variety of improved connector assemblies utilizing a limited number of interchangeable component parts for interconnecting remote signal stations to a central signal processing system. Prior connector assemblies were generally individually unique for each specific interconnection requirement with very few interchangeable components. However, the connector assemblies of the present invention have the same basic components which can be rearranged in different combinations to meet a multiplicity of interconnection needs including adapters, bridging assemblies, modem or data jacks, junction assemblies and various combinations thereof. Therefore, the present invention simplifies the construction of such connector assemblies by reducing on-site wiring requirements as well as significantly reduces the requirement of large, diverse inventories of assembly component parts.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A connector assembly for electrically connecting at least one first multi-conductor cable to a plurality of conductors electrically coupled to telephone signal equipment, each said cable terminating in a first modular connector component having a first plurality of contact elements, said assembly comprising:

an enclosure defined by a plurality of wall members;
a removable support member disposed within said enclosure and including spaced mounting shoulders;
at least one second modular connector component slidably mountable in said support member at any selected position between said shoulders, each said second connector component including a housing having an aperture therein and side wall means defining a cavity for receiving one said first connector component and a second plurality of contact elements having active contact portions projecting into said cavity for engagement with said first plurality of contact elements when said first connector component is inserted into said cavity through said aperture, first mounting means disposed on opposite side walls of said housing for mounting said housing on said support member between said shoulders wherein the central axis of said cavity normal to said aperture is aligned in a first direction relative to the plane defined by said shoulders, and second mounting means disposed on opposite side walls of said housing for mounting said housing on said support member between said shoulders wherein said central axis is aligned in a second direction relative to said plane and at an angle to said first direction; and
circuit means for electrically connecting each said second plurality of contact elements to selected ones of said plurality of conductors coupled to telephone signal equipment.

2. The connector assembly as described in claim 1, wherein said support member includes at least one recessed portion, each said portion having opposing side edges forming said shoulders.

3. The connector assembly as described in claim 1, wherein at least one said wall member includes at least one aperture therein, said aperture being aligned substantially coaxial with the cavity of one said second connector component to provide access thereto for engagement with one said first connector component.

4. The connector assembly as described in claim 1, wherein said circuit means comprises multiple contact means disposed within said enclosure electrically engageable with said plurality of conductors coupled to telephone signal equipment and selectively connected to each said second plurality of contact elements.

5. The connector assembly as described in claim 4, wherein said multiple contact means comprises a third modular connector component mounted to said support member and including a plurality of contacts selectively electrically connected to each said second plurality of contact elements, said plurality of conductors being terminated in a fourth modular connector component adapted for mating engagement with said third modular connector component.

6. The connector assembly as described in claim 4, wherein said multiple contact means comprises at least one terminal contact strip mounted to the inner surface of said bottom wall and including a plurality of terminal contact elements, said terminal contact elements being electrically coupled to said second plurality of contact elements and electrically engageable with said plurality of conductors.

7. The connector assembly as described in claim 1, wherein said circuit means comprises a third modular connector component disposed within said enclosure and including a third plurality of contact elements adapted for connection to said plurality of conductors, a plurality of intermediate multiple contact means disposed within said enclosure with each said intermediate contact means including a fourth plurality of contact elements adapted for selective and independent connection to an impedance network, integral circuit means within said enclosure for interconnecting selected ones of said second, third and fourth plurality of contact elements and for interconnecting respective first multi-conductor cables to said plurality of conductors as each fourth plurality of contact elements is coupled to an impedance network.

8. The connector assembly as described in claim 7, wherein said enclosure includes means for slidably mounting said support member therein spaced substantially parallel from the inner surface of one said wall member, said support member including a plurality of pairs of spaced shoulders with each said pair of shoulders being adapted to receive at least two said second connector components, said one said wall member having an opening therein for providing acess to the cavities of said second connector components for interengagement of said first and second modular connector components.

9. An electrical connector assembly for selectively interconnecting at least one remote signal station having a predetermined signal characteristic to a central signal processing system comprising:

an enclosure defined by a plurality of wall members including a bottom wall member and a plurality of sidewall members;

first multiple contact means disposed within said enclosure and including a first plurality of contact elements electrically engageable with said central signal processing system;

a support member, including at least one pair of spaced mounting shoulders, releasably mountable within said enclosure spaced from and substantially parallel to the inner surface of one said sidewall member, said one said sidewall member including an opening therein to provide access to said support member;

second multiple contact means mounted to said support member within said enclosure and including a second plurality of contact elements electrically engageable with said remote signal stations through said opening said second multiple contact means comprising at least one second modular connector component slidably mountable in said support member at any selected position between said shoulders, each said second modular connector component including a cavity for receiving through said opening a first modular connector component electrically connected to at least one said remote signal station, said second plurality of contact elements having active contact portions projecting into each cavity of said one second modular connector component for engagement with the first modular connector component inserted therein, said second modular connector component further including a housing having an aperture therein and a plurality of sidewalls defining said cavity, with said first connector component being insertable into said cavity through said aperture and said opening, first mounting means disposed on opposite sidewalls for slidably mounting said housing between said shoulders and wherein the central axis of said cavity normal to said aperture is aligned substantially perpendicular relative to the plane of said support member, and second mounting means disposed on opposite sidewalls for slidably mounting said housing between said shoulders and wherein the central axis of said cavity is aligned substantially parallel to the plane of said support member;

a plurality of intermediate multiple contact means disposed within said enclosure, each said intermediate multiple contact means including a third plurality of contact elements;

at least one impedance network adapted for selective and independent connection to the third plurality of contact elements of one said intermediate multiple contact means; and circuit means disposed within said enclosure for interconnecting selected ones of said first, second and third plurality of contact elements and for interconnecting a respective given one of said remote signal stations to said central signal processing system as a respective given one of said third plurality of contact elements is coupled to one said impedance network.

10. The connector assembly as described in claim 9, wherein said second multiple contact means comprises a single multiple contact connector component mounted to said support member, said remote signal stations being electrically engaged to another multiple contact connector component adapted for mating engagement through said opening with said single multiple contact connector component to electrically interconnect said remote signal stations to said central signal processing system.

11. The connector assembly as described in claim 9, wherein said support member includes a plurality of said pairs of shoulders and said second contact means include a plurality of said second modular connector components, said remote signal stations being electrically connected to a plurality of said first modular connector components each of which is engageable with one said second modular connector component, each said pair of shoulders being adapted to mount at least two said second modular connector components therebetween.

12. The connector assembly as described in claim 9, wherein the housing and mounting means of each said second modular connector component comprises an integrally molded plastic unit configured to allow the fabrication of said unit in a single-action mold.

13. A connector assembly for electrically connecting at least one first multi-conductor cable to a plurality of conductors electrically coupled to telephone signal equipment, each said cable terminating in a first modular connector component having a first plurality of contact elements, said assembly comprising:

an enclosure defined by a plurality of wall members;

a removable support member disposed within said enclosure and including at least one pair of spaced mounting shoulders;

at least one second modular connector component slidably mountable in said support member at any selected position between the shoulders of one said pair of shoulders, each said second connector component including a cavity for receiving one said first connector component and a second plurality of contact elements having active contact portions projecting into said cavity for engagement with said first plurality of contact elements when said first connector component is inserted into said cavity, each said second connector component comprises a housing including a front wall having an aperture therein, a back wall and a plurality of said walls defining said cavity, one said first connector component being insertable into said cavity through said aperture, first mounting means disposed on oppositely facing sidewalls for slidably mounting said housing between the shoulders of one said pair of shoulders wherein the central axis of said cavity normal to said aperture is aligned in a first direction relative to the plane defined by said pair of shoulders, and second mounting means disposed on oppositely facing sidewalls for slidably mounting said housing between the shoulders of one said pair of shoulders wherein said central axis is aligned in a second direction relative to said plane and substantially perpendicular to said first direction, said first and second mounting means each including retention means for firmly maintaining said housing in said selected position between said shoulders; and circuit means for electrically connecting each said second plurality of contact elements to selected ones of said plurality of conductors coupled to telephone signal equipment.

14. The connector assembly as described in claim 13, wherein said retention means comprise embossments integral with said housing to biasly engage said shoulders to firmly maintain said shoulders within said mounting means.

15. The connector assembly as described in claim 13, wherein each said first and second mounting means include mounting channels disposed along the outer surfaces of respective oppositely facing housing sidewalls, said channels slidably receiving said shoulders therein to mount said housing within said support member.

16. The connector assembly as described in claim 15, wherein said retention means comprise integral embossments disposed within said mounting channels to biasly engage and firmly maintain said shoulders within said channels at any said selected position.

17. The connector assembly as described in claim 15, wherein the channels of at least one said mounting means are defined by a plurality of projections disposed on the oppositely facing housing sidewalls of said at least one mounting means, said retention means being disposed on the channel-forming surfaces of the projections forming each said channel and comprising at least one pliable tab member disposed on said channel-forming surfaces for bias engagement against the shoulder inserted within said channel.

18. The connector assembly as described in claim 13, wherein said plurality of enclosure wall members comprises a bottom wall member and a plurality of sidewall members disposed substantially perpendicular to said bottom wall member, and wherein said assembly further comprises a removable cover mountable on said sidewall members and means for mounting said support member substantially parallel to and spaced from said bottom wall member, said first and second mounting means of each second connector component being adapted to align the central axis of said second connector component cavity substantially perpendicular and substantially parallel, respectively, to the plane of said support member.

19. A connector assembly for electrically connecting at least one first multi-conductor cable to a plurality of conductors electrically coupled to telephone signal equipment, each said cable terminating in a first modular connector component having a first plurality of contact elements, said assembly comprising:

an enclosure defined by a plurality of wall members;

a removable support member in the form of a printed circuit board disposed within said enclosure and including spaced mounting shoulders;

at least one second modular connector component slidably mounted in said support member at any selected position between said shoulders, each said second connector component including a cavity for receiving one said first connector component and a second plurality of contact elements having active contact portions projecting into said cavity for engagement with said first plurality of said contact elements when said first connector component is inserted into said cavity; and circuit means including said printed circuit board for electrically connecting each said second plurality of contact elements to selected ones of said plurality of conductors coupled to telephone signal equipment.

20. A connector assembly for electrically connecting at least one first multi-conductor cable to a plurality of conductors electrically coupled to telephone signal equipment, each said cable terminating in a first modular connector component having a first plurality of contact elements, said assembly comprising:

an enclosure defined by a plurality of wall members;

a removable support member disposed within said enclosure and including at least one pair of spaced mounting shoulders;

at least one second modular connector component slidably mountable in said support member at any selected position between the shoulders of one said pair of shoulders, each said second connector component including a cavity for receiving one said first connector component and a second plurality of contact elements having active contact portions projecting into said cavity for engagement with said first plurality of contact elements when said first connector component is inserted into said cavity; and circuit means for electrically connecting each said second plurality of contact elements to selected ones of said plurality of conductors coupled to telephone signal equipment, said circuit means comprising multiple contact means disposed within said enclosure electrically engageable with said plurality of conductors coupled to telephone signal equipment and selectively connected to each said second plurality of contact elements, said support member comprising a printed circuit board having a printed circuit disposed thereon electrically connected to the second plurality of contact elements of said second connector components, and wherein said multiple contact means comprises said printed circuit and a plurality of terminal contact elements disposed on said board electrically connected to said printed circuit, said terminal contact elements being selectively electrically engageable with said plurality of conductors.

* * * * *